(12) United States Patent
Cho et al.

(10) Patent No.: US 9,730,139 B2
(45) Date of Patent: Aug. 8, 2017

(54) METHOD AND APPARATUS FOR ESTABLISHING WI-FI SESSION IN WIRELESS COMMUNICATION SYSTEM

(71) Applicant: LG ELECTRONICS INC., Seoul (KR)

(72) Inventors: Heejeong Cho, Seoul (KR); Eunjong Lee, Seoul (KR); Hyeyoung Choi, Seoul (KR); Genebeck Hahn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 104 days.

(21) Appl. No.: 14/761,405

(22) PCT Filed: Feb. 20, 2014

(86) PCT No.: PCT/KR2014/001366
§ 371 (c)(1),
(2) Date: Jul. 16, 2015

(87) PCT Pub. No.: WO2014/129811
PCT Pub. Date: Aug. 28, 2014

(65) Prior Publication Data
US 2015/0365878 A1     Dec. 17, 2015

Related U.S. Application Data

(60) Provisional application No. 61/766,698, filed on Feb. 20, 2013, provisional application No. 61/768,540, (Continued)

(51) Int. Cl.
*H04W 88/06* (2009.01)
*H04W 40/12* (2009.01)
*H04W 24/10* (2009.01)

(52) U.S. Cl.
CPC ........ *H04W 40/12* (2013.01); *H04W 24/10* (2013.01)

(58) Field of Classification Search
None
See application file for complete search history.

(56) References Cited

U.S. PATENT DOCUMENTS

2009/0172171 A1* 7/2009 Amir ............... H04L 63/0428
                                                    709/227
2011/0305153 A1* 12/2011 Lee ................. H04W 36/14
                                                    370/252

(Continued)

FOREIGN PATENT DOCUMENTS

WO    2007036764 A1    4/2007
WO    2011097173 A1    8/2011

(Continued)

OTHER PUBLICATIONS

European Patent Office Application No. 14754390.4, Search Report dated Jul. 26, 2016, 7 pages.

(Continued)

*Primary Examiner* — Jay P Patel
(74) *Attorney, Agent, or Firm* — Lee Hong Degerman Kang & Waimey

(57) ABSTRACT

A method and apparatus for establishing a session in a wireless communication system is provided. An entity of a primary radio access technology (RAT) system receives measurement results on the primary RAT system and a secondary RAT system from a multi-RAT device, determines a routing rule and a routing type for bearers which are appropriate for simultaneous transmission through the primary RAT system and the secondary RAT system, based on quality of service (QoS) and the measurement results, and transmits a routing control request message to a packet data network (PDN) gateway (P-GW). The routing control (Continued)

request message includes identifiers (IDs) of the bearers which are appropriate for simultaneous transmission, the routing type for each bearer, and the routing rule for each bearer.

8 Claims, 14 Drawing Sheets

Related U.S. Application Data filed on Feb. 25, 2013, provisional application No. 61/821,729, filed on May 10, 2013.

(56) References Cited

U.S. PATENT DOCUMENTS

| 2012/0236735 | A1* | 9/2012 | Nory | H04W 52/365 370/252 |
|---|---|---|---|---|
| 2013/0016696 | A1 | 1/2013 | Adjakple et al. | |
| 2013/0041981 | A1 | 2/2013 | Kim et al. | |
| 2013/0272260 | A1* | 10/2013 | Bitran | H04W 16/14 370/329 |
| 2015/0282011 | A1* | 10/2015 | Watfa | H04W 36/0022 370/332 |

FOREIGN PATENT DOCUMENTS

| WO | 2012148166 | 11/2012 |
|---|---|---|
| WO | 2012165809 | 12/2012 |

OTHER PUBLICATIONS

PCT International Application No. PCT/KR2014/001366, Written Opinion of the International Searching Authority dated May 19, 2014, 1 page.

* cited by examiner

FIG. 4

| Frame control | Persistent /ID | Address 1 | Address 2 | Address 3 | Sequence control | Address 4 | Sequence control | QoS control | HT control | Frame body | FCS |

METHOD AND APPARATUS FOR ESTABLISHING WI-FI SESSION IN WIRELESS COMMUNICATION SYSTEM

CROSS-REFERENCE TO RELATED APPLICATIONS

This application is the National Stage filing under 35 U.S.C. 371 of International Application No. PCT/KR2014/001366, filed on Feb. 20, 2014, which claims the benefit of U.S. Provisional Application Nos. 61/766,698, filed on Feb. 20, 2013, 61/768,540, filed on Feb. 25, 2013 and 61/821,729, filed on May 10, 2013, the contents of which are all hereby incorporated by reference herein in their entirety.

BACKGROUND OF THE INVENTION

Field of the Invention

The present invention relates to wireless communications, and more specifically, to a method and apparatus for establishing a Wi-Fi session in a wireless communication system.

Related Art

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless local area network (WLAN) system. The cellular system may be one of a $3^{rd}$ generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

The arrival of the ubiquitous environment led to a sharp increase in demand for seamless services anytime, anywhere. The fifth generation mobile communication system may adopt a plurality of radio access technologies (RATs) for always gaining easy access and maintaining efficient performance in any place. In other words, the fifth-generation mobile communication system may use multiple RATs in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system. In general, a 3GPP LTE(-A) or IEEE 802.16 cellular system with relatively broad coverage may be a primary RAT system, and a Wi-Fi system with relatively narrower coverage may be a secondary RAT system.

In general, in an interworking system of the cellular system and the WLAN system, all data flows transmitted/received through a secondary RAT system (e.g., Wi-Fi system) as well as a primary RAT system (e.g., cellular system) may be controlled by a device operating as a local mobility anchor (LMA). When a session for the cellular system already exists, a method for establishing a session for the Wi-Fi system may be required for simultaneous transmission.

SUMMARY OF THE INVENTION

The present invention provides a method and apparatus for establishing a Wi-Fi session in a wireless communication system. The present invention provides a method for establishing a local mobility anchor (LMA)-based Wi-Fi session for simultaneous transmission in a converged communication system of a cellular system and a Wi-Fi system. That is, the present invention provides a method for establishing an additional Wi-Fi session when a cellular session exists.

In an aspect, a method for establishing, by an entity of a primary radio access technology (RAT) system, a session in a wireless communication system is provided. The method includes receiving measurement results on the primary RAT system and a secondary RAT system from a multi-RAT device, determining a routing rule and a routing type for bearers which are appropriate for simultaneous transmission through the primary RAT system and the secondary RAT system, based on quality of service (QoS) and the measurement results, and transmitting a routing control request message to a packet data network (PDN) gateway (P-GW). The routing control request message includes identifiers (IDs) of the bearers which are appropriate for simultaneous transmission, the routing type for each bearer, and the routing rule for each bearer.

The QoS may include at least one of a quality class identifier (QCI), an allocation and retention priority (ARP), bit rate of traffic per bearer, and bit rates of traffic per group of bearers.

The routing type may be either a bandwidth aggregation or a bandwidth segregation.

If the routing type is the bandwidth aggregation, the routing rule may indicate a transmission ratio through the primary RAT system and the secondary RAT system.

If the routing type is the bandwidth segregation, the routing rule may indicate one of the primary RAT system or the secondary RAT system.

The measurement results may be received via a secondary RAT access response message or a secondary RAT measurement report message.

The method may further include before receiving the measurement results, transmitting a secondary RAT access request message, which includes a list of access points (APs) of the secondary RAT system and an access type, to the multi-RAT device.

The method may further include receiving a routing control response message from the P-GW as a response to the routing control request message. the routing control response message may include a result for the routing control request message, an ID of a bearer which is subject to the simultaneous transmission, the routing type for the bearer, and the routing rule for the bearer.

The method may further include upon receiving the routing control response message, transmitting a routing control command message to the multi-RAT device. The routing control command message may include the ID of the bearer which is subject to the simultaneous transmission, the routing type for the bearer, the routing rule for the bearer, and security information.

The method may further include upon receiving the routing control response message, transmitting a secondary RAT access request message to the multi-RAT device. The secondary RAT access request message may include a list of APs of the secondary RAT system, an access type, a routing control command flag, the ID of the bearer which is subject to the simultaneous transmission, the routing type for the bearer, the routing rule for the bearer, and security information.

The method may further include upon transmitting the secondary RAT access request message, receiving a secondary RAT access response message from the multi-RAT device. The secondary RAT access response message may include a result of an access procedure, and a type of the access procedure.

The method may further include transmitting a routing control cancel message to the P-GW if the result of the access procedure is failure.

The primary RAT system may be a 3rd generation partnership project (3GPP) long-term evolution (LTE) system, and the secondary RAT system may be an institute of electrical and electronics engineers (IEEE) 802.11 system.

The entity of the primary RAT system may be one of an eNodeB (eNB), a mobility management entity (MME), or a new entity.

In another aspect, a method for establishing, by a packet data network (PDN) gateway (P-GW), a session in a wireless communication system is provided. The method includes receiving a routing control request message from an entity of a primary radio access technology (RAT) system. The routing control request message includes identifiers (IDs) of bearers which are appropriate for simultaneous transmission through the primary RAT system and a secondary RAT system, a routing type for each bearer, and a routing rule for each bearer. The method includes determining whether the bearers are subject to the simultaneous transmission, the routing type for each bearer, and the routing rule for each bearer, and transmitting a routing control response message to the entity of the primary RAT system as a response to the routing control request message. The routing control response message includes a result for the routing control request message, an ID of a bearer which is subject to the simultaneous transmission, the routing type for the bearer, and the routing rule for the bearer.

Additional Wi-Fi data flow session can be effectively established.

BRIEF DESCRIPTION OF THE DRAWINGS

FIG. 4 shows an example of a frame structure of IEEE 802.11.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
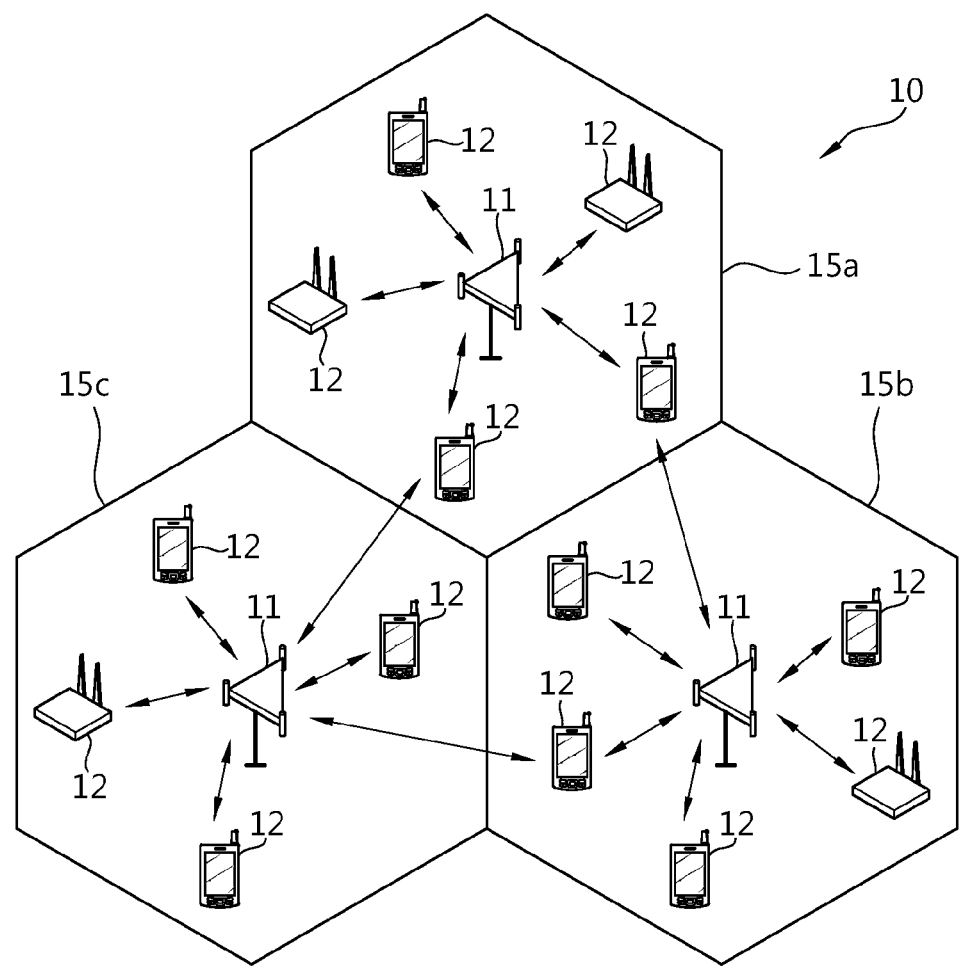
FIG. 1 shows a cellular system.

FIG. 1 shows a cellular system.

Referring to FIG. 1, the cellular system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell.

Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
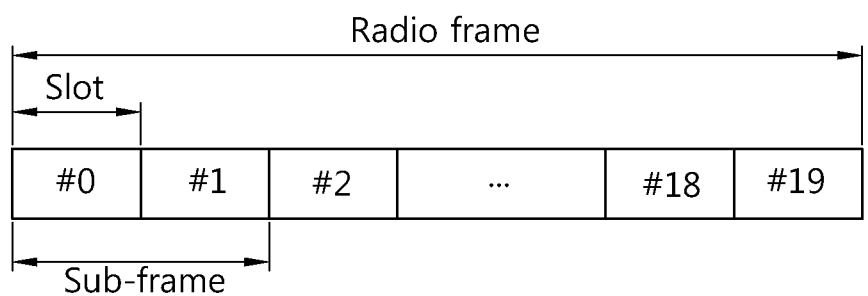
FIG. 2 shows an example of a radio frame structure of 3GPP LTE.

FIG. 2 shows an example of a radio frame structure of 3GPP LTE. It may be referred to Section 4 of 3GPP TS 36.211 V8.2.0 (2008-03).

Referring to FIG. 2, the radio frame includes 10 subframes, and one subframe includes two slots. The slots in the radio frame are numbered by #0 to #19. A transmission time interval (TTI) is a scheduling unit for a data transmission. In 3GPP LTE, one TTI may be identical with a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
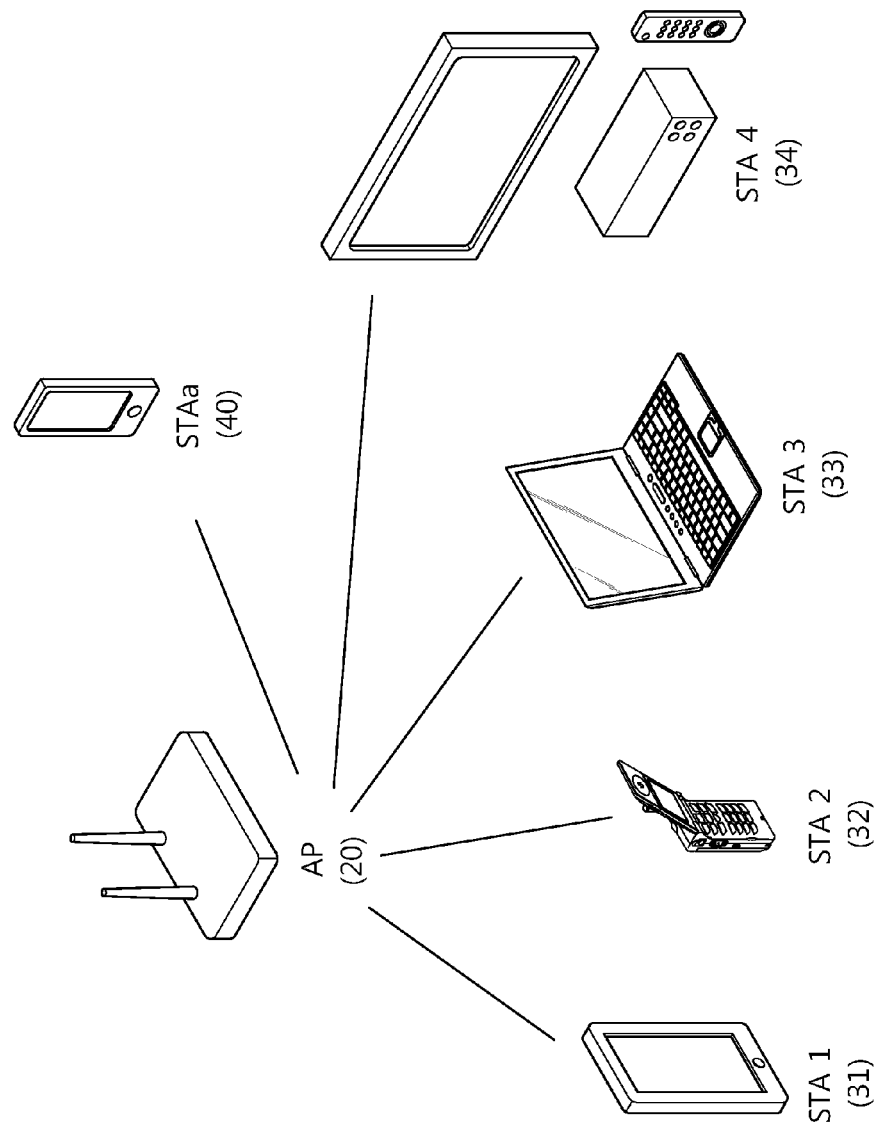
FIG. 3 shows a wireless local area network (WLAN) system.

FIG. 3 shows a wireless local area network (WLAN) system.

The WLAN system may also be referred to as a Wi-Fi system. Referring to FIG. 3, the WLAN system includes one access point (AP) 20 and a plurality of stations (STAs) 31, 32, 33, 34, and 4). The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 3 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network.

The STA is random functional medium that includes a physical layer interface for a wireless medium and an media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

FIG. 4 shows an example of a frame structure of IEEE 802.11.

A frame of IEEE 802.11 includes a set of fields in a fixed order. Referring to FIG. 4, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype.

That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A de-authentication frame is used to finish an authentication relation. An association request frame is transmitted so that the mobile station participates in the network when the mobile station recognizes the compatible network and is authenticated. An association response frame is a response for the association request frame. A de-association frame is used to finish an association relation.

Three states may exist according to an authentication and association procedure in IEEE 802.11. Table 1 below shows the three states of IEEE 802.11.

TABLE 1

|  | Authentication | Association |
|---|---|---|
| State 1 | X | X |
| State 2 | O | X |
| State 3 | O | O |

To transmit a data frame, a device must perform the authentication and association procedure with respect to a network. In Table 1, a procedure of transitioning from the state 1 to the state 2 can be called the authentication procedure. The authentication procedure can be performed in such a manner that one device acquires information on a different device and authenticates the different device. The information on the different device can be acquired by using two methods, i.e., a passive scanning method for acquiring information on a different node by receiving a beacon frame and an active scanning method for acquiring the information on the different device by transmitting a probe request message and receiving a probe response message received in response thereto. The authentication procedure can be complete by exchanging an authentication request frame and an authentication response frame.

In Table 1, a procedure of transitioning from the state 2 to the state 3 can be called the association procedure. The association procedure can be complete when two devices exchange the association request frame and the association response frame upon completion of the authentication procedure. An association ID can be allocated by the association procedure.

Figure 5:
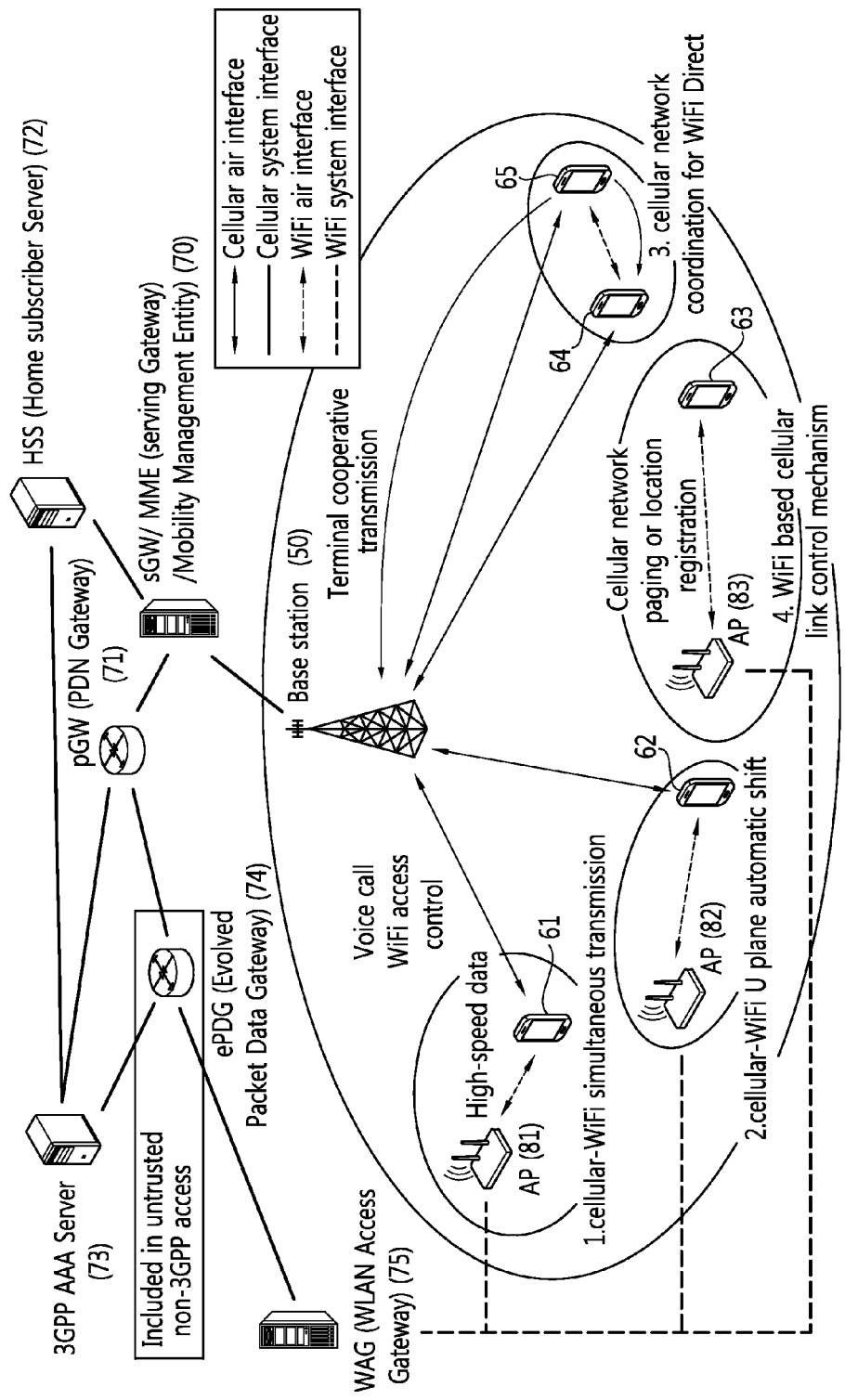
FIG. 5 shows an example of a scenario of a converged communication system of a cellular system and a Wi-Fi system.

FIG. 5 shows an example of a scenario of a converged communication system of a cellular system and a Wi-Fi system.

It is assumed in FIG. 5 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 5, there are a plurality of general devices 61, 62, 63, 64, and 65 in the coverage of the cellular base station 50. Each of the general devices 61, 62, 63, 64, and 65 may be a user equipment in a cellular system. The cellular base station 50 may communicate with each of the general devices 61, 62, 63, 64, and 65 via a cellular radio interface. For example, the cellular base station 50 may perform voice call communication with each of the general devices 61, 62, 63, 64, and 65 or may control access of each general device 61, 62, 63, 64, and 65 to a Wi-Fi system.

The cellular base station 50 is connected to a serving gateway (S-GW)/mobility management entity (MME) 70 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 70 is connected to a packet data network (PDN) gateway (P-GW) 71 and a home subscriber server (HSS) 72 through the cellular system interface. The PDN-GW is a gateway having a PDN as an end point.

The P-GW 71 and the HSS 72 are connected to a 3GPP access authentication authorization (AAA) server 73 through the cellular system interface. The P-GW 71 and the 3GPP AAA server 73 may be connected to an evolved packet data gateway (ePDG) 74 through the cellular system interface. The ePDG 74 may be included only in un-trusted non-3GPP access. The ePDG 74 may be connected to a WLAN access gateway (WAG) 75. The WAG 75 may be in charge of a P-GW in a Wi-Fi system.

Meanwhile, a plurality of APs 81, 82, and 83 may be present in the coverage of the cellular base station 50. Each of the APs 81, 82, and 83 may have coverage which is shorter than that of the cellular base station 50. Each of the APs 81, 82, and 83 may communicate with general devices 61, 62, and 63 that are present in its coverage through a Wi-Fi radio interface. In other words, the general devices 61, 62, and 63 may communicate with the cellular base station 50 and/or APs 81, 82, and 83. Communication methods of the general devices 61, 62, and 63 are as follows:

1) Cellular/Wi-Fi simultaneous radio transmission: the general device 61 may perform high-speed data communication with the AP 81 through a Wi-Fi radio interface while communicating with the cellular base station 50 through a cellular radio interface.

2) Cellular/Wi-Fi user plane automatic shift: the general device 62 may communicate with one of the cellular base station 50 and the AP 82 by user plane automatic shift. At this time, the control plane may be present in both the cellular system and the Wi-Fi system or only in the cellular system.

3) Terminal cooperative transmission: the general device 64 operating as a source device may directly communicate with the cellular base station 50 through a cellular radio interface or may indirectly communicate with the cellular base station 50 through a general device 65 operating as a cooperative device. That is, the cooperative device 65 may assist the source device 64 so that the source device 64 may indirectly communicate with the cellular base station 50 through itself. The source device 64 and the cooperative device 65 communicate with each other through a Wi-Fi radio interface.

4) Wi-Fi-based cellular link control mechanism: the AP 83 may perform a cellular link control mechanism such as paging or location registration of a network for the cellular general device 63. The general device 63 is not directly connected to the cellular base station 50 and may directly communicate with the cellular base station 50 thorough the AP 83.

Each of the APs 81, 82, and 83 is connected to the WAG 75 through a Wi-Fi system interface.

In general, in an interworking system of the cellular system and the WLAN system, all data flows may be transmitted and/or received simultaneously through a plurality of RAT systems (e.g., primary RAT system, secondary RAT system). In addition, all data flows transmitted/received through a secondary RAT system (e.g., Wi-Fi system) as well as a primary RAT system (e.g., cellular system) may be controlled by a device operating as a local mobility anchor (LMA). For example, referring to FIG. 5, data to be transmitted through a cellular system and data to be transmitted through a Wi-Fi system always go through the P-GW. That is, In FIG. 5, a device serving as an LMA may be the P-GW. In this regard, a term "LMA" used in a proxy mobile Internet protocol (PMIP) protocol may be called a different term in another protocol, such as home agent (HA).

When data flows are transmitted through the plurality of RAT systems simultaneously in the converged communication system of the cellular system and the Wi-Fi system, scenarios for simultaneous transmission may be classified into U-Plane separation for the same data flow (or, bandwidth aggregation) and U-plane separation for different data flows (or, bandwidth segregation).

Figure 6:
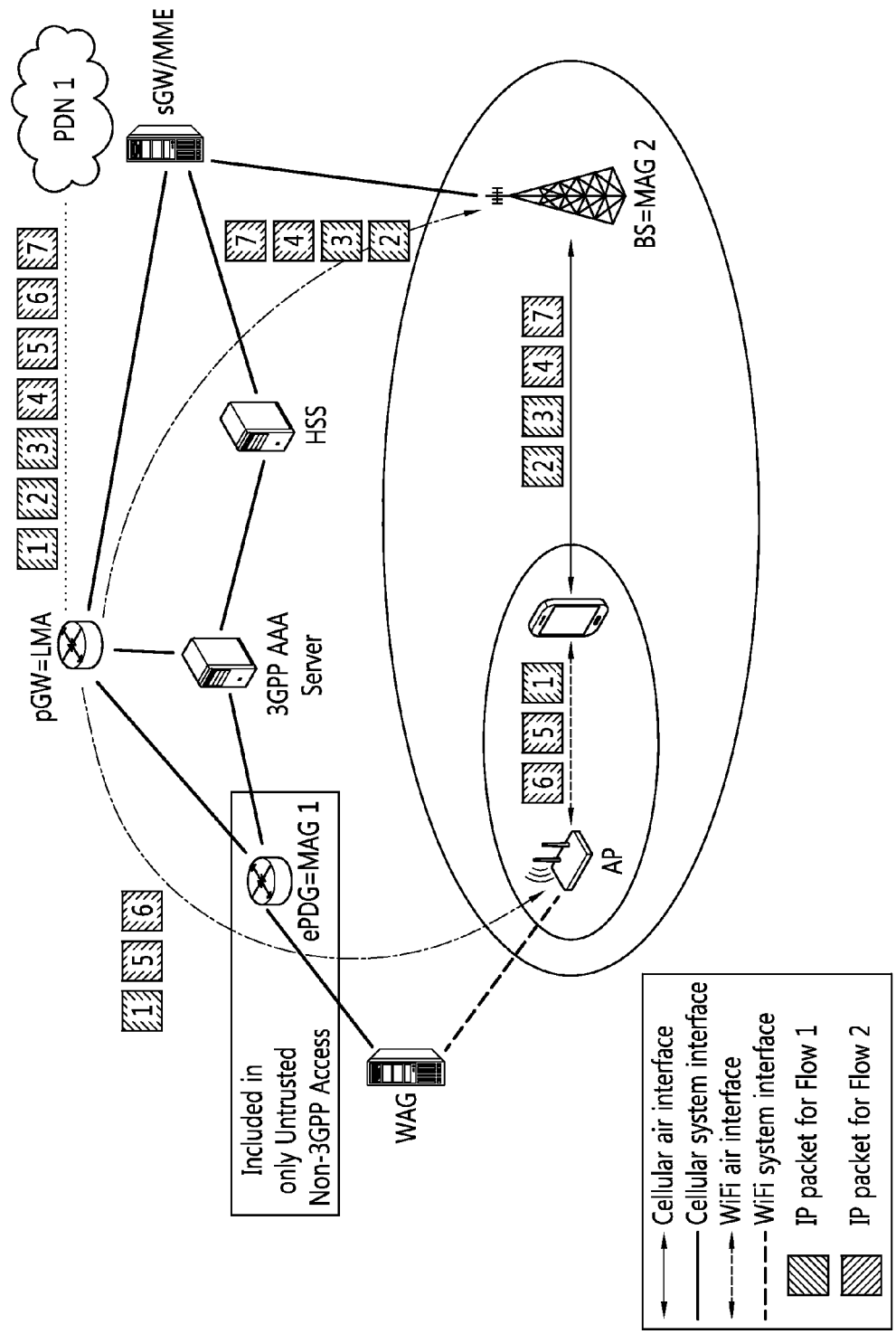
FIG. 6 shows an example of IP flow mobility in a converged communication system of a cellular system and a Wi-Fi system.

FIG. 6 shows an example of IP flow mobility in a converged communication system of a cellular system and a Wi-Fi system. FIG. 6 shows U-plane separation for the same data flow, i.e., bandwidth/U-plane aggregation.

Referring to FIG. 6, IP packets for flow 1 include IP packets 1, 2, and 3, and IP packets for flow 2 include IP packets 4, 5, 6, and 7. The P-GW is connected to a PDN 1, and operates as an LMA. That is, all IP packets are transmitted to a UE through the P-GW. The IP packet 1 in the IP packet for flow 1 is transmitted to the UE through the Wi-Fi system by going through an ePDG and/or a WAG, and IP packets 2 and 3 are transmitted to the UE through the cellular system by going through a BS. In this case, the ePDG or the WAG may be a mobile access gateway (MAG) in the Wi-Fi system, and the BS may be a MAG in the cellular system. In the IP packet for flow 2, the IP packets 5 and 6 are transmitted to the UE through the Wi-Fi system by going through the PDG and/or the WAG, and IP packets 4 and 7 are transmitted to the UE through the cellular system by going through the BS. That is, IP packets for different flows are aggregated each other.

Figure 7:
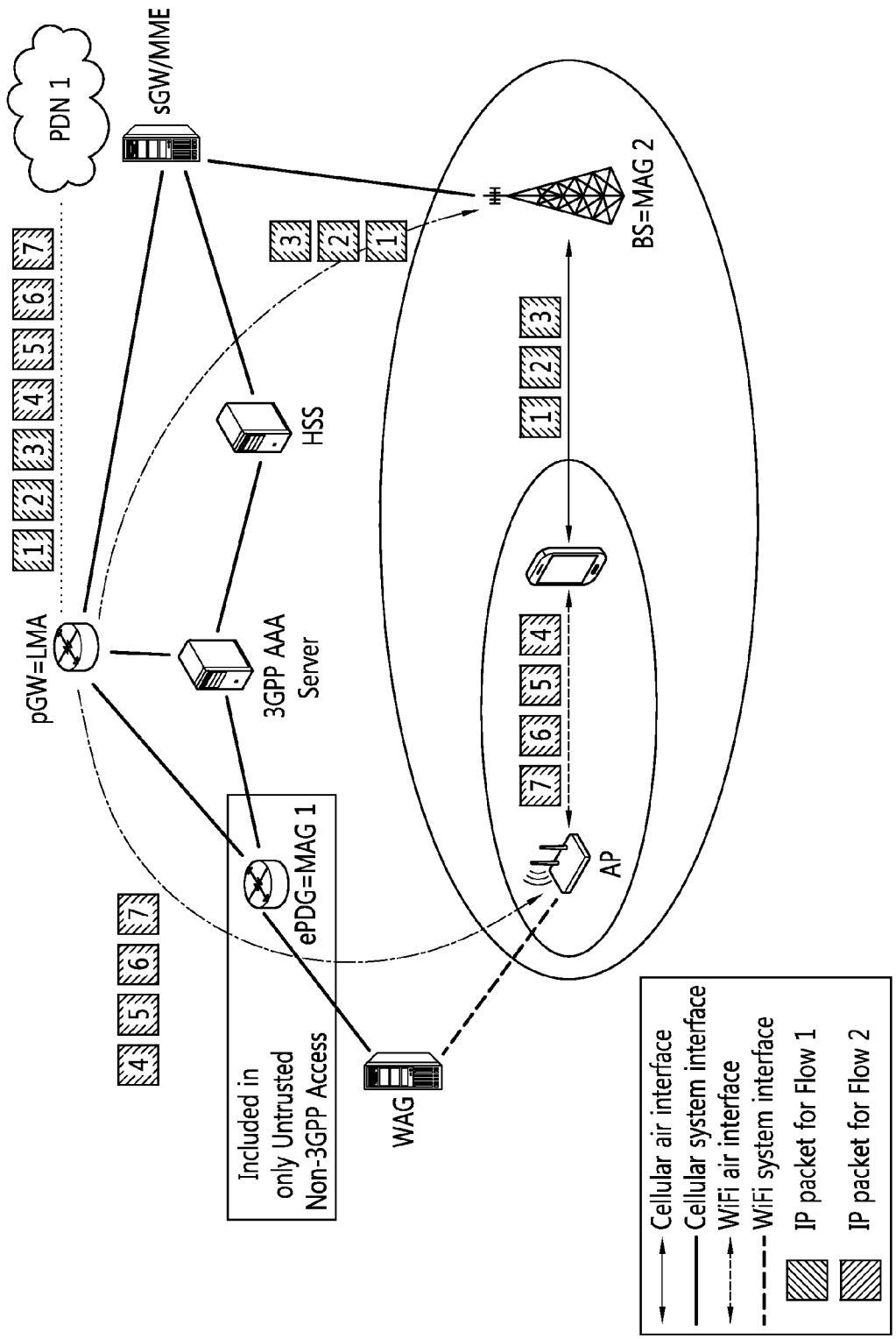
FIG. 7 shows another example of IP flow mobility in a converged communication system of a cellular system and a Wi-Fi system.

FIG. 7 shows another example of IP flow mobility in a converged communication system of a cellular system and a Wi-Fi system. FIG. 7 shows U-plane separation for different data flows, i.e., bandwidth/U-plane segregation.

Referring to FIG. 7, IP packets for flow 1 include IP packets 1, 2, and 3, and IP packets for flow 2 include IP packets 4, 5, 6, and 7. The P-GW is connected to a PDN 1, and operates as an LMA. That is, all IP packets are transmitted to a UE through the P-GW. The IP packets for flow 1 are transmitted to the UE through the cellular system by going through a BS. In this case, the BS may be an MAG in the cellular system. The IP packets for flow 2 are transmitted to the UE through the Wi-Fi system by going through the ePDG and/or the WAG. In this case, the ePDG or the WAG may be an MAG in the Wi-Fi system. That is, IP packets for different flows are segregated each other.

Figure 8:
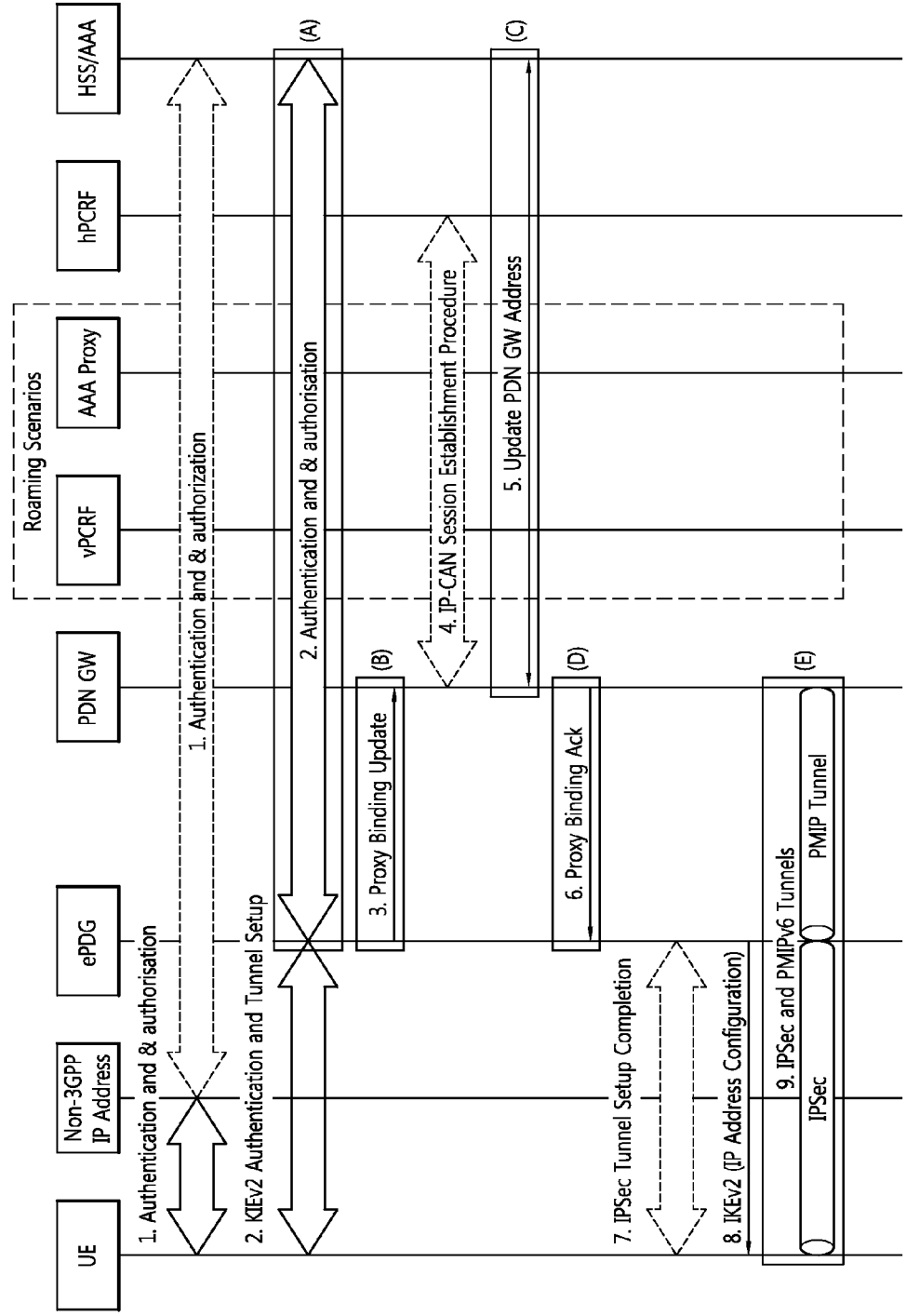
FIG. 8 shows an initial attachment procedure over PMIP based S2b for roaming, non-roaming and LBO.

FIG. 8 shows an initial attachment procedure over PMIP based S2b for roaming, non-roaming and LBO. It may be referred to Section 7.2.1 of 3GPP TS 23.402 V11.5.0 (2012-12).

This clause is related to the case when the UE powers-on in an un-trusted non-3GPP IP access network via the PMIP based S2b interface.

PMIPv6 specification is used to setup a PMIPv6 tunnel between the ePDG and the P-GW. It is assumed that MAG is collocated with ePDG. The IPsec tunnel between the UE and the ePDG provides a virtual point-to-point link between the UE and the MAG functionality on the ePDG.

This procedure is also used to establish the first PDN connection over an un-trusted non-3GPP access with PMIPv6 on S2b when the UE already has active PDN connections only over a 3GPP access and wishes to establish simultaneous PDN connections to different APNs over multiple accesses.

The UE may be authenticated and authorized to access the un-trusted non-3GPP access network with an access network specific procedure.

1) The access authentication procedure between UE and the 3GPP EPC may be performed. In the roaming case signalling may be routed via a 3GPP AAA proxy in the VPLMN. As part of the AAA exchange for network access authentication, the AAA/HSS and/or the 3GPP AAA proxy may return to the non-3GPP IP access a set of home/visited operator's policies to be enforced on the usage of local IP address, or IPv6 prefix, allocated by the access system upon successful authentication. Subscription data is provided to the non-3GPP IP access by the HSS/AAA in this step.

2) The IKEv2 tunnel establishment procedure is started by the UE. The UE may indicate in a notification part of the IKEv2 authentication request that it supports MOBIKE. The ePDG IP address to which the UE needs to form IPsec tunnel is discovered via DNS query. The UE may request connectivity to a specific PDN providing an APN that is conveyed with IKEv2. For networks supporting multiple mobility protocols, if there was any dynamic IPMS decision involved in this step, the decision is stored in the 3GPP AAA server. The P-GW information is returned as part of the reply from the 3GPP AAA server to the ePDG. If the UE has provided an APN the ePDG verifies that it is allowed by subscription. If the UE has not provided an APN the ePDG uses the default APN. The P-GW selection takes place at this point. This may entail an additional name resolution step, issuing a request to a DNS server. If there is no requested IP address in the CFG_Request from the UE to the ePDG which indicates the attach is an initial attach, the ePDG may perform a new P-GW selection procedure, e.g., to allocate a P-GW that allows for more efficient routing. The UE shall indicate the type of address(es) (IPv4 address or IPv6 prefix/address or both) in the CFG_Request sent to the ePDG during IKEv2 message exchange. If the PDN requires an additional authentication and authorisation with an external AAA server, the UE includes the authentication credentials in this step.

3) The ePDG sends the proxy binding update (MN-NAI, Lifetime, APN, Access Technology Type, Handover Indicator, GRE key for downlink traffic, UE Address Info, Charging Characteristics, Additional Parameters) message to the P-GW. Access Technology Type option is set to a value matching the characteristics of the non-3GPP IP access. Handover Indicator is set to indicate attachment over a new interface. The proxy binding update message shall be secured. The MN NAI identifies the UE. The Lifetime field must be set to a nonzero value in the case of a registration and a zero value in the case of deregistration. The APN is used by the P-GW to determine which PDN to establish connectivity for, in the case that the P-GW supports multiple PDN connectivity. The ePDG creates and includes a PDN connection identity if the ePDG supports multiple PDN connections to a single APN. The UE Address Info shall be set based on the CFG_Request in step 1 and subscription profile in the same way as the PDN type is selected during the E-UTRAN initial attach. The Additional Parameters include the authentication credentials for an additional authentication and authorization with an external AAA server if it was provided by the UE in step 2. The P-GW performs the authentication and authorization with the external AAA server if it is required to get access for the given APN.

4) The P-GW initiates the IP CAN session establishment procedure with the PCRF.

5) The selected P-GW informs the 3GPP AAA server of the P-GW identity. The 3GPP AAA Server then informs the HSS of the P-GW identity and APN associated with the UE's PDN connection. The message includes information that identifies the PLMN in which the P-GW is located. This information is registered in the HSS.

6) The P-GW processes the proxy binding update and creates a binding cache entry for the UE. The P-GW allocates an IP address for the UE. The P-GW then sends a proxy binding ack (MN NAI, UE Address Info, GRE Key for uplink traffic, Charging ID) message to the ePDG, including the IP address(es) allocated for the UE (identified by the MN NAI). If the corresponding proxy binding update contains the PDN connection identity, the P-GW shall acknowledge if multiple PDN connections to the given APN are supported. The Charging ID is assigned for the PDN connection for charging correlation purposes.

7) After the proxy binding update is successful, the ePDG is authenticated by the UE and indicates to the UE that the authentication and authorization with the external AAA server is successful.

8) The ePDG sends the final IKEv2 message with the IP address in IKEv2 configuration payloads. The ePDG also includes the identity of the associated PDN (APN) in the IDr payload of IKEv2. In case the UE provided APN to the ePDG in the earlier steps, the ePDG shall not change the provided APN.

9) IP connectivity from the UE to the P-GW is now setup. Any packet in the uplink direction is tunneled to the ePDG by the UE using the IPSec tunnel. The ePDG then tunnels the packet to the P-GW. From the P-GW normal IP-based routing takes place. In the downlink direction, the packet for UE (HoA) arrives at the P-GW. The P-GW tunnels the packet based on the binding cache entry to the ePDG. The ePDG then tunnels the packet to the UE via proper IPsec tunnel.

In scenarios for simultaneous transmission, a method for establishing, by a network, a session to support seamless connectivity for data flows may be required. Accordingly, according to an embodiment of the present invention, a method for establishing, under the control of a primary RAT system, a data flow session for the same PDN in a secondary RAT system is described. In a following description, it is assumed that the primary RAT system is a 3GPP LTE system and the secondary RAT system is a Wi-Fi system, but the present invention is not limited thereto. In a following description, it is assumed that a mobility IP network protocol is a PMIP, but the present invention is not limited thereto. The present invention may be applied to other protocols, such as a dual stack mobile IP (DSMIP) protocol, GPRS tunneling protocol (GP), etc. In addition, in the primary RAT system, it is assumed that a data flow session for the same PDN already exists.

In addition, the present invention may be applied when a newly established PDN connection, or PDN connection under establishment (e.g., RRC connection establishment, attach, UE-requested PDN connectivity), or an existing PDN connection is routed in units of flows. When a newly established PDN connection or a PDN connection under establishment is routed in units of flows, the entity of the LTE system may establish a session for the LTE system (e.g., the PDN session between a UE and S-GW/P-GW) and a session for the Wi-Fi system in parallel. At this time, the session for the LTE system and the session for the Wi-Fi system may be established independently or dependently. When the session for the LTE system and the session for the Wi-Fi system are established independently, a procedure for determining a routing type or routing rule may be performed subsequently after the sessions are established. When the session for the LTE system and the session for the Wi-Fi system are established dependently, the routing type or routing rule may be determined at the time of the establishment.

A service provider cost reduction policy based on a user subscription type is described. A user may use a voice service on an hourly rate or without limitation according to a pricing model. Similarly, the user may use a messaging service such as a short message service (SMS) or multimedia message service (MMS) based on the number of messages or without limitation according to a pricing model. If a user who has subscribed to a pricing model for unlimited use attempts to use the voice and messaging service, it is more economical for a communication service provider to provide the corresponding service through the Wi-Fi system. Also, the communication service provider may offer a pricing model utilizing the Wi-Fi system to the users who have subscribed to usage-based pricing model, namely, pricing in proportion to hours of use or the number of uses. For example, if the hours of use or the number of uses by the user exceeds a predetermined limit according to a specific pricing model, the communication service provider may provide the corresponding service through the Wi-Fi system.

Figure 9:
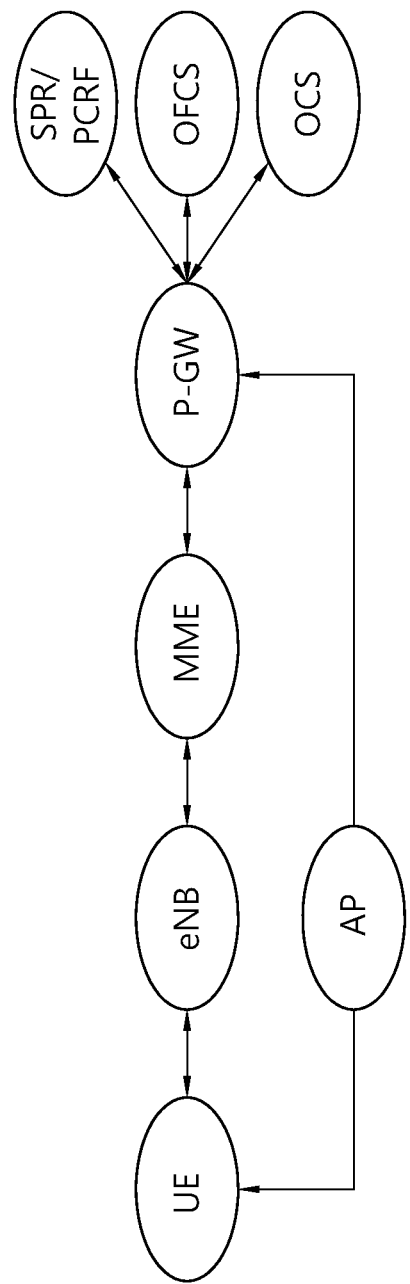
FIG. 9 shows an example of a service provider cost reduction policy using user subscription information.

FIG. 9 shows an example of a service provider cost reduction policy using user subscription information. A communication service provider may manage user subscription information by using a subscriber profile repository (SPR), offline charging system (OFCS), online charging system (OCS), etc. The SPR may manage information such as allowed services and allowed QoS. The OFCS may manage information such as accounting data (the amount of traffic, connection time, etc) for each UE. The OCS may manage the remaining usage for each UE. Information for operations required by the communication service provider according to the user subscription information may be delivered to each entity. In other words, the communication service provider may deliver its preferred network type (e.g., LTE system or Wi-Fi system) for each service to each entity such as UE, eNB, and MME. The information for the operations required by the communication service provider according to the user subscription information may be delivered during a PDN connection (bearer) establishment/modification process or U-plane separation request/response process. The delivered information may be used as a criterion by which appropriateness of the U-plane separation is determined.

As described below, there may be four different approaches to implement a method for establishing an additional data flow session of the Wi-Fi system under the control of the LTE system while a data flow session of the LTE system is already present.

1) A target device for simultaneous transmission (e.g., UE and multi-RAT device) checks whether it can access the Wi-Fi system, and the LTE system determines whether to establish an additional Wi-Fi data flow session. After the determination, the LTE system requests the corresponding target device to attach to the Wi-Fi system. This method is suitable when the corresponding target device holds connections to various PDNs.

2) Based on a measurement result on the Wi-Fi system reported by the device, the LTE system determines whether to establish an additional Wi-Fi data flow session. The LTE system requests the target device for simultaneous transmission to associate with the Wi-Fi system and attach thereto. This method is suitable when the corresponding target device holds connections to various PDNs.

3) The device performs association with the Wi-Fi system and attachment thereto. An entity of the LTE system (e.g., HSS, 3GPP AAA, P-GW) which has received the attachment from the corresponding device establishes an additional Wi-Fi data flow session. This is suitable when the corresponding target device holds a connection to one PDN.

4) The device performs association with the Wi-Fi system and attachment thereto. An entity of the LTE system (e.g., HSS, 3GPP AAA, P-GW) which has received the attachment from the corresponding device determines a connection to apply simultaneous transmission and establishes an additional Wi-Fi data flow session. This is suitable when the corresponding target device holds connections to various PDNs.

In the description above, if the corresponding device is in an associated state which means that the corresponding device completes connection to the Wi-Fi system, the association procedure may be skipped.

Hereinafter, each method is described with reference to a specific embodiment of the present invention.

(1) Method 1

Figure 10:
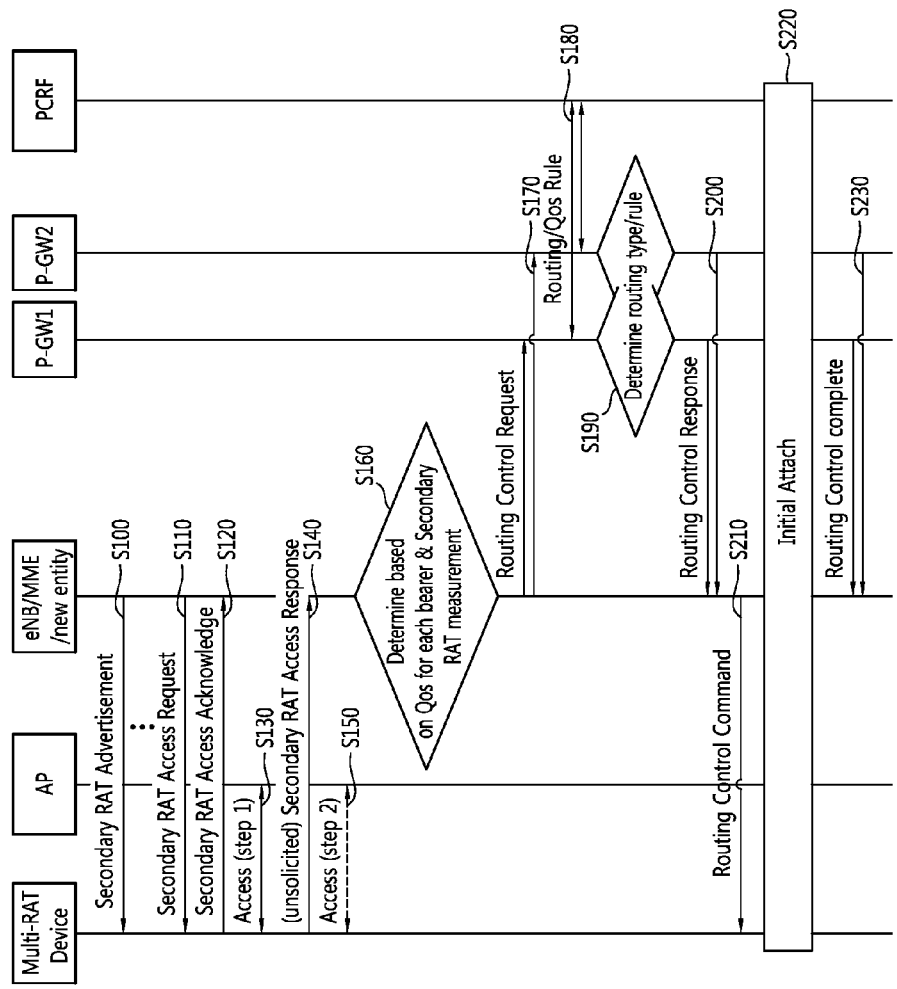
FIG. 10 shows an example of a method for establishing a session according to an embodiment of the present invention.

FIG. 10 shows an example of a method for establishing a session according to an embodiment of the present invention.

In step S100, an entity of the LTE system such as an eNB, MME, and new entity may transmit a secondary RAT advertisement message to a multi-RAT device. The secondary RAT advertisement message may include information related to the Wi-Fi system such as an AP list, access request indicator, and access type.

The AP list carries information of APs within coverage of a serving eNB to which multi-RAT devices belong. Information of an AP includes MAC address of the AP (BSSID), SSID of the AP, homogeneous ESS ID (HESSID) of the AP, and information about a radio channel used by the AP (operating class, channel number, etc). If the secondary RAT advertisement message is transmitted in a unicast manner, the secondary RAT advertisement message includes only the information of APs in the neighborhood of the multi-RAT device based on the location information of the multi-RAT device.

The access request indicator indicates whether an operation according to the access type has been requested. For example, if the value of the access request indicator is 0b1, it indicates that a request for performing the operation has been requested. If the access request indicator indicates performing of the operation, the access request indicator may make the multi-RAT device perform the same operation as the reception of the secondary RAT access request message which is described later in step S110.

The access type indicates a step among scanning, pre-association, and association step, up to which the multi-RAT device has to perform to connect to the Wi-Fi system. In other words, the access type may be any one of the scanning, pre-association, and association. Whether to incorporate the access type into the secondary RAT advertisement message may be determined according to the value of the access request indicator.

Or, in step S110, the entity of the LTE system may transmit a secondary RAT access request message to the multi-RAT device. The secondary RAT access request message may include an AP list and access type. In a situation where a heavy load is applied on the LTE system, the entity of the LTE system may request a multi-RAT device, which exhibits poor link quality related to the LTE system or deals with time-tolerant traffic, to perform an operation according to the access type. The AP list and access type included in the secondary RAT access request message are the same as the AP list and access type included in the second RAT advertisement message described in step S100.

In step S120, the multi-RAT device transmits a secondary RAT access acknowledge message to the entity of the LTE system as a response to the received secondary RAT advertisement message or the received secondary RAT access request message.

In step S130, the multi-RAT device and AP perform an operation according to the access type. If a Wi-Fi radio frequency (RF) unit is turned off, the multi-RAT device turns on the Wi-Fi RF unit. This operation is a user-transparent RAT coordination, but not a UE-transparent RAT coordination. If the access type is scanning, the multi-RAT device attempts active/passive scanning on APs acquired in step S100 or S110 described above. If the access type is pre-association, the multi-RAT device attempts pre-association with the acquired APs. If the access type is association, the multi-RAT device attempts association with the acquired APs (which includes active/passive scanning, authentication, and association).

In step S140, the multi-RAT device transmits a (unsolicited) secondary RAT access response message to the entity of the LTE system. Accordingly, the multi-RAT device may report to the entity of the LTE system about the operation result according to the access type. The (unsolicited) secondary RAT access response message may include an accessible AP list from among acquired APs and measurement results on the corresponding APs. In other words, there may be an AP to which the multi-RAT device cannot connect due to scanning failure or because the AP is closed-type.

In step S150, since some steps for connecting to the Wi-Fi system may not be performed depending on the access type, the multi-RAT device and a specific AP may perform association with the Wi-Fi system.

In step S160, the entity of the LTE system determines which bearer is appropriate in which PDN for simultaneous transmission. The entity of the LTE system may determine which flow of which bearer in which PDN is appropriate for simultaneous transmission based on QoS of flow of each bearer in each PDN possessed by the multi-RAT device and measurement results on the Wi-Fi system and/or LTE system reported by the multi-RAT device. At this time, the QoS may include a quality class identifier (QCI), allocation and retention priority (ARP), bit rate or traffic per bearer, and bit rates of traffic per group of bearers. Similarly, the entity of the LTE system may determine which bearer in which PDN is appropriate for simultaneous transmission based on QoS of all of the bearers in each PDN possessed by the multi-RAT device and measurement results on the Wi-Fi system and/or LTE system reported by the multi-RAT device. The entity of the LTE system may determine routing type and routing rule based on the QoS, measurement results, and air/network load of each RAT system. The routing type may be one of a bandwidth aggregation or bandwidth segregation. If the routing type is the bandwidth aggregation, the routing rule may indicate a transmission ratio through each RAT system. If the routing type is the bandwidth segregation, the routing rule may indicate a transmission RAT system.

In step S170, the entity of the LTE system transmits a routing control request message to one or more P-GW corresponding to the PDN determined in step of S160. The routing control request message may include an evolved packet system (EPS) bearer ID appropriate for simultaneous transmission, flow ID appropriate for simultaneous transmission, routing type for each EPS bearer or flow, and routing rule for each EPS bearer or flow. There may be multiple flows for a single EPS bearer. Each flow may have different QOS each other. Also, all routing rules for the each routing types may be included, which may be used for the P-GW to finally determine one routing type/rule.

In step S180, the P-GW acquires routing type/rule about the corresponding bearer or flow from the PCRF.

In step S190, based on the routing type/rule acquired from the entity of the LTE system or PCRF, or both, the P-GW determines whether to apply simultaneous transmission to the corresponding bearer/flow and routing type/rule. For example, if multiple flows are mapped to one bearer and a specific flow is determined to be routed, the P-GW may determine the routing type as the bandwidth aggregation.

In step S200, the P-GW transmits a routing control response message to the entity of the LTE system. The routing control response message may include a result (acceptance or rejection) as a response to a request of the entity of the LTE system. If the P-GW accepts the request of the entity of the LTE system, the routing control response message may include an ID of an EPS bearer to which simultaneous transmission is applied, ID of a flow to which simultaneous transmission is applied, routing type applied to each EPS bearer/flow, and routing rule applied to each EPS bearer/flow. In the LTE system, a UE and P-GW share traffic flow description information (e.g., source and destination IP address, port numbers, and protocol information) with each other as a traffic flow template within protocol configuration options. If only a specific flow is routed, by delivering the traffic flow description information, the P-GW may inform the UE about which flow within the corresponding EPS bearer is routed.

In step S210, the entity of the LTE system transmits a routing control command message to the multi-RAT device. First, if a request of the entity of the LTE system is accepted, the entity of the LTE system temporarily stores information for simultaneous transmission (e.g., a P-GW to which simultaneous transmission is applied). Information for simultaneous transmission may be stored temporarily in an HSS, for example. If a request of the entity of the LTE system is accepted, the routing control command message may include the ID of the EPS bearer to which simultaneous transmission is applied, the ID of a flow to which simultaneous transmission is applied, routing type applied to each data radio bearer (DRB)/EPS bearer/flow, routing rule applied to each DRB/EPS bearer/flow, and security information. The entity of the LTE system may transmit a different ID (e.g., E-UTRAN radio access bearer (E-RAB) ID, DRB ID, logical channel ID (LCID)) mapped to the corresponding EPS bearer ID additionally or transmit the different ID by replacing the corresponding EPS bearer ID. Meanwhile, if the routing type is the bandwidth segregation and the transmission RAT system is a Wi-Fi system, the multi-RAT device may stop UL data transmission of the corresponding EPS bearer.

If a request of the entity of the LTE system is rejected, the entity of the LTE system may command the multi-RAT device to perform an operation for the Wi-Fi system. In this case, the operation may include disassociation, suspension of scanning, and turning off of RF unit.

In step S220, an initial attachment is performed. Procedures such as the initial attachment procedure over PMIP based S2b described in FIG. 8 may be used.

In step S230, the P-GW perceives that the multi-RAT device, where simultaneous transmission is applied, has been attached and applies a determined routing type/rule. The P-GW transmits a routing control complete message to the entity of the LTE system. The routing control complete message may include an EPS bearer ID.

Meanwhile, if the routing type is the bandwidth segregation and there is no more data to transmit through the corresponding EPS bearer, the P-GW or the entity of the cellular system (e.g., MME) may release or deactivate the corresponding EPS bearer. Also, the E-RAB ID, DRB ID or LCID which is mapped to the corresponding EPS bearer may be released or deactivated together. For releasing or deactivating the E-RAB ID, an existing message of the LTE system, such as the E-RAB release command message and E-RAB release indication message, may be used. For releasing or deactivation of the DRB ID and LCID, an existing message of the LTE system, such as the RRC connection reconfiguration message, may be used. When the corresponding message is received, the multi-RAT device may stop UL data transmission.

It should be noted, however, that if a default bearer is separated into the U-plane in the Wi-Fi system and a dedicated bearer is still maintained in the LTE system, the corresponding EPS bearer may not be released or deactivated. In other words, the EPS bearer which has been separated into the U-plane in the Wi-Fi system corresponds to a linked EPS bearer of another EPS bearer operating in the LTE system, the corresponding EPS bearer may not be released or deactivated.

(2) Method 2

Figure 11:
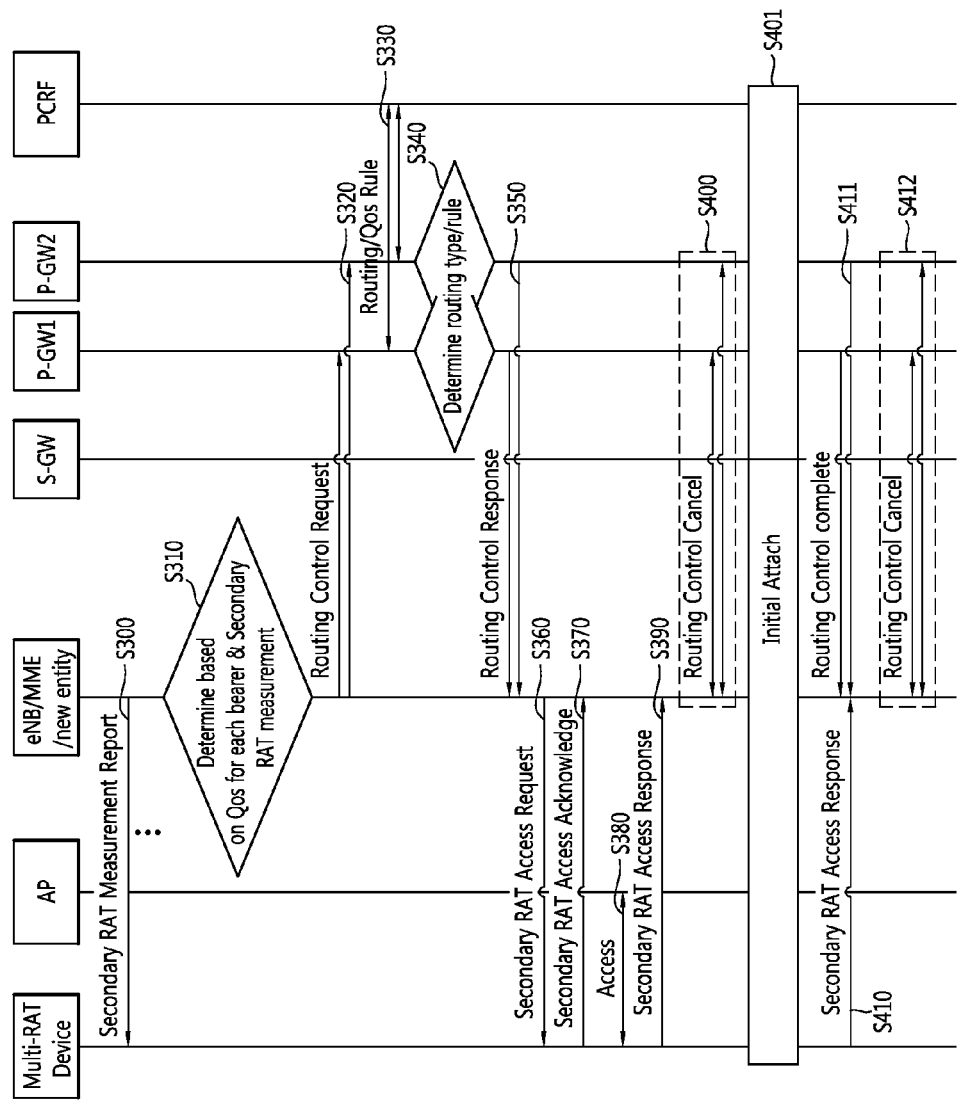
FIG. 11 shows an example of a method for establishing a session according to another embodiment of the present invention.

FIG. 11 shows an example of a method for establishing a session according to another embodiment of the present invention.

In step S300, the multi-RAT device transmits a secondary RAT measurement report message to the entity of the LTE system such as an eNB, MME, and new entity. Accordingly, the multi-RAT device may report measurement results on the Wi-Fi system. The secondary RAT access measurement report message may include an accessible AP list and measurement results on the corresponding APs. In other words, there may be an AP to which the multi-RAT device cannot connect due to scanning failure or because the AP is closed-type. At this time, an existing message of the LTE system, such as the RRC connection reconfiguration message or UE measurement report message, can be used. For example, the type of measurement field within the UE measurement report message may be set to "inter-RAT", and the measurement report triggering field within the UE measurement report message may be set to "Inter-RAT neighbor becomes better than threshold".

Step S310 to S350 of FIG. 11 are the same respectively as step S160 to S200 of FIG. 10. Therefore, descriptions are omitted.

In step S360, the entity of the LTE system transmits a secondary RAT access request message to the multi-RAT device. First, if the request of the entity of the LTE system is accepted, the entity of the LTE system temporarily stores information for simultaneous transmission of the multi-RAT system (e.g., a P-GW to which simultaneous transmission is applied). Information for simultaneous transmission may be stored temporarily in an HSS, for example. If the request of the entity of the LTE system is accepted, the entity of the LTE system requests the multi-RAT device to perform the operation according to the access type (namely, 3GPP attachment) and delivers information for simultaneous transmission to the multi-RAT device. At this time, the secondary RAT access request message may include an AP list, access type, routing control command flag, ID of the EPS bearer to which simultaneous transmission is applied, ID of a flow to which simultaneous transmission is applied, routing type applied to each DRB/EPS bearer/flow, routing rule applied to each DRB/EPS bearer/flow, and security information.

The AP list carries information of APs within coverage a serving eNB to which multi-RAT devices belong. Information of an AP includes MAC address of the AP (BSSID), SSID of the AP, HESSID of the AP, and information about a radio channel used by the AP (operating class, channel number, etc). The secondary RAT request message includes only the information of APs having large signal strength based on the measurement results of the multi-RAT device.

The access type indicates a step among scanning, pre-association, association step, and 3GPP attachment, up to which the multi-RAT device has to perform to connect to the Wi-Fi system. In other words, the access type may be any one of the scanning, pre-association, association, and 3GPP attachment. The routing control command flag indicates execution of simultaneous transmission and inclusion of related information.

Meanwhile, information for simultaneous transmission may be transmitted after a general device completes access in a normal manner.

In step S370, the multi-RAT device transmits a secondary RAT access acknowledge message to the entity of the LTE system as a response to the received secondary RAT access request message.

In step S380, the multi-RAT device and AP perform an operation according to the access type. If a Wi-Fi RF unit is turned off, the multi-RAT device turns on the Wi-Fi RF unit. If the access type is pre-association, the multi-RAT device attempts pre-association with the APs acquired in step S360 described above. If the access type is association, the multi-RAT device attempts association with the acquired APs (which includes active/passive scanning, authentication, and association). If the access type is 3GPP attachment, the multi-RAT device attempts 3GPP attachment to the acquired APs (which includes active/passive scanning, authentication, and 3GPP attachment).

In step S390, the multi-RAT device may transmit a secondary RAT access response message to the entity of the LTE system. Accordingly, the multi-RAT device may report to the entity of the LTE system about results of accessing to the Wi-Fi system from among operations according to the access type. The secondary RAT access response message may include a result, type, and associated AP. The result indicates a result according to the access type (success or failure). The type may be one of scanning, pre-association, and association. The associated AP may be included when the result is success and the type is the association.

If the result included in the second RAT access response message is failure, in step S400, the entity of the LTE system may transmit a routing control cancel message to the corresponding P-GW. Accordingly, the routing control requested in step S320 may be cancelled. A routing control cancel message may include an EPS bearer ID. The P-GW which receives the routing control cancel message cancels application of a new routing rule. Also, the entity of the LTE system deletes information for simultaneous transmission stored temporarily in step S360.

If the result included in the secondary RAT access response message is success, in step S401, an initial attachment is performed. Procedures such as the initial attachment procedure over PMIP based S2b described in FIG. 8 may be used.

Also, in step S410, the multi-RAT device may transmit a secondary RAT access response message to the entity of the LTE system. Accordingly, the multi-RAT device may report to the entity of the LTE system about results of 3GPP attachment from among operations according to the access type. The secondary RAT access response message may include a result, type, and associated AP. The result indicates a result according to the access type (success or failure). The type may be 3GPP attachment. Meanwhile, if the routing type within the secondary RAT access request message received in step S360 is the bandwidth segregation and the transmission RAT system is a Wi-Fi system, the multi-RAT device may stop UL data transmission of the corresponding EPS bearer.

If the result included in the secondary RAT access response message is success, in step S411, the P-GW perceives that the multi-RAT device to which simultaneous transmission is applied has been attached and applies a determined routing type/rule. The P-GW transmits a routing control complete message to the entity of the LTE system. The routing control complete message may include an EPS bearer ID.

If the result included in the secondary RAT access response message is failure, in the step S412, the entity of the LTE system transmits a routing control cancel message to the corresponding P-GW. Accordingly, cancellation of the routing control requested in step S320 can be requested. The routing control cancel message may include an EPS bearer ID. The P-GW receiving the routing control cancel message cancels application of a new routing rule. Also, the entity of the LTE system deletes information for simultaneous transmission stored temporarily in step S360.

Meanwhile, if the routing type is the bandwidth segregation and there is no more data to transmit through the corresponding EPS bearer, the P-GW or the entity of the cellular system (e.g., MME) may release or deactivate the corresponding EPS bearer. Also, the E-RAB ID, DRB ID or LCID which is mapped to the corresponding EPS bearer may be released or deactivated together. The multi-RAT device may stop UL data transmission. It should be noted that, however, if a default bearer is separated into the U-plane in the Wi-Fi system and a dedicated bearer is still maintained in the LTE system, the corresponding EPS bearer may not be released or deactivated. In other words, the EPS bearer which has been separated into the U-plane in the Wi-Fi system corresponds to a linked EPS bearer of another EPS bearer operating in the LTE system, the corresponding EPS bearer may not be released or deactivated.

(3) Method 3

Figure 12:
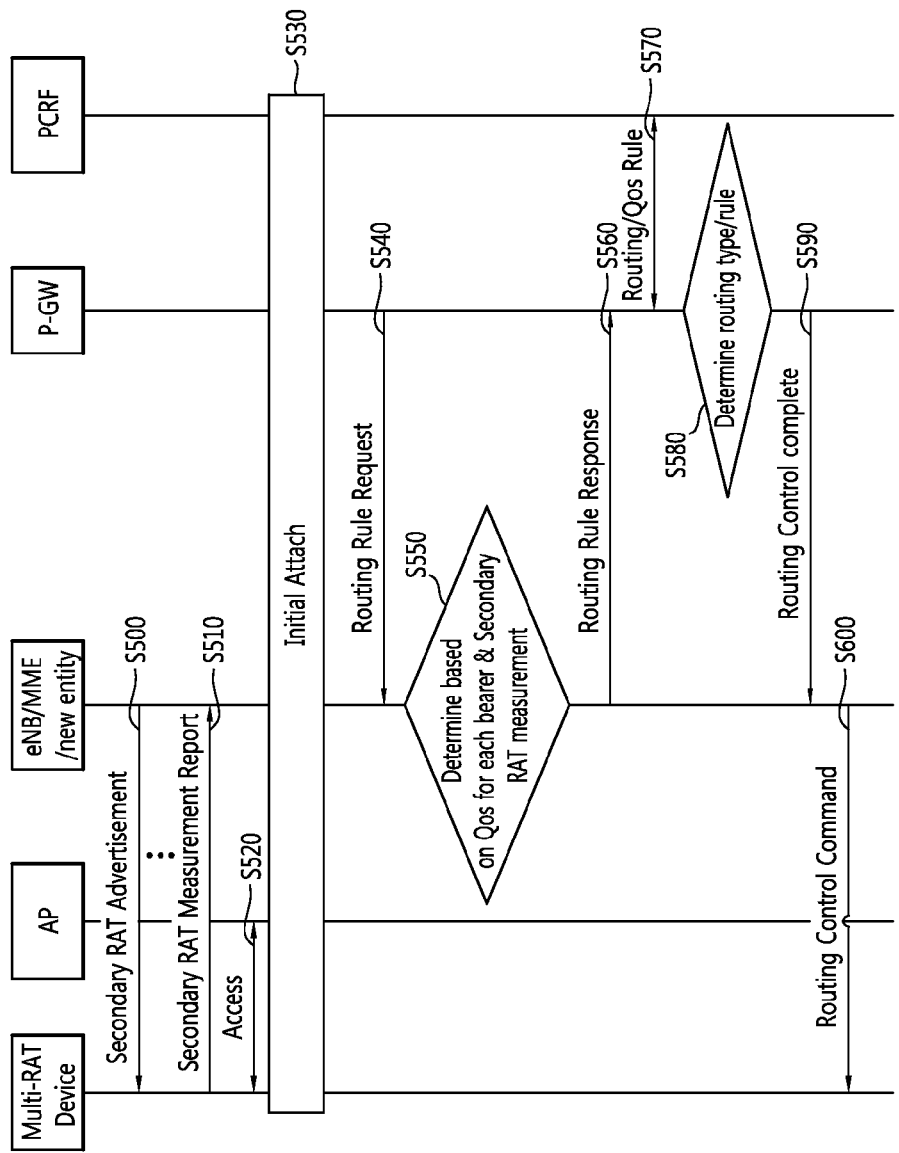
FIG. 12 shows an example of a method for establishing a session according to another embodiment of the present invention.

FIG. 12 shows an example of a method for establishing a session according to another embodiment of the present invention.

In step S500, the entity of the LTE system such as an eNB, MME, or new entity may transmit a secondary RAT advertisement message to the multi-RAT device. The secondary RAT advertisement message may include an AP list, access request indicator, and access type.

In step S510, the multi-RAT device may transmit a secondary RAT measurement report message to the entity of the LTE system. The secondary RAT access measurement report message may include an accessible AP list and measurement results on the corresponding APs.

In step S520, the multi-RAT device performs access to an AP. If a Wi-Fi RF unit is turned off, the multi-RAT device turns on the Wi-Fi RF unit. In step S530, an initial attachment is performed. Procedures such as the initial attachment procedure over PMIP based S2b described in FIG. 8 may be used.

In step S540, the P-GW transmits a routing rule request message to the entity of the LTE system. Accordingly, the P-GW, which has perceived attachment of the multi-RAT device, may request a routing rule for a bearer(s) of the corresponding multi-RAT device.

In step S550, the entity of the LTE system determines which bearer is appropriate for simultaneous transmission. The entity of the LTE system, based on QoS (QCI, ARP, bit rate of traffic per bearer, bit rates of traffic per group of bearers, and so on) of a flow of the corresponding bearer and measurement results on the Wi-Fi system or LTE system reported by the multi-RAT system, may determine which flow within which bearer is appropriate for simultaneous transmission. Similarly, the entity of the LTE system may determine which bearer is appropriate for simultaneous transmission based on QoS of the corresponding bearer and measurement results on the Wi-Fi system or LTE system reported by the multi-RAT device. The entity of the LTE system may determine the routing type and routing rule based on the QoS, measurement results, and air/network load of each RAT system. The routing type may be one of a bandwidth aggregation or bandwidth segregation. If the routing type is the bandwidth aggregation, the routing rule may indicate a transmission ratio through each RAT system. If the routing type is the bandwidth segregation, the routing rule may indicate to a transmission RAT system.

In step S560, the entity of the LTE system transmits a routing rule response message to the P-GW. Specific operations are the same as in step S170 of FIG. 10. Step S570 and S580 are the same respectively as step S180 and S190 of FIG. 10. Therefore, descriptions thereof are omitted.

In step S590, the P-GW transmits a routing control complete message to the entity of the LTE system. The routing control complete message may include an ID of the EPS bearer to which simultaneous transmission is applied, ID of a flow to which simultaneous transmission is applied, routing type applied to each EPS bearer/flow, and routing rule applied to each EPS bearer/flow. In the LTE system, a UE and P-GW share traffic flow description information (e.g., source and destination IP address, port numbers, and protocol information) with each other as a traffic flow template within protocol configuration options. If only a specific flow is routed, by delivering traffic flow description information, the P-GW may inform the UE about which flow within the corresponding EPS bearer is routed.

In step S600, the entity of the LTE system transmits a routing control command message to the multi-RAT device. The entity of the LTE system temporarily stores information for simultaneous transmission. The routing control command message may include an ID of the EPS bearer to which simultaneous transmission is applied, ID of a flow to which simultaneous transmission is applied, routing type applied to each DRB/EPS bearer/flow, routing rule applied to each DRB/EPS bearer/flow, and security information. The entity of the LTE system may transmit a different ID (E-RAB ID, DRB ID, or LCID) mapped to the corresponding EPS bearer ID additionally or transmit the different ID by replacing the corresponding EPS bearer ID. If the routing type is the bandwidth segregation and transmission RAT system is the Wi-Fi system, the multi-RAT device may stop UL data transmission of the corresponding EPS bearer.

Meanwhile, if the routing type is the bandwidth segregation and there is no more data to transmit through the corresponding EPS bearer, the P-GW or the entity of the cellular system (e.g., MME) may release or deactivate the corresponding EPS bearer. Also, the E-RAB ID, DRB ID or LCID which is mapped to the corresponding EPS bearer may be released or deactivated together. The multi-RAT device may stop UL data transmission. It should be noted that, however, if a default bearer is separated into the U-plane in the Wi-Fi system and a dedicated bearer is still maintained in the LTE system, the corresponding EPS bearer may not be released or deactivated. In other words, the EPS bearer which has been separated into the U-plane in the Wi-Fi system corresponds to a linked EPS bearer of another EPS bearer operating in the LTE system, the corresponding EPS bearer may not be released or deactivated.

(4) Method 4

Figure 13:
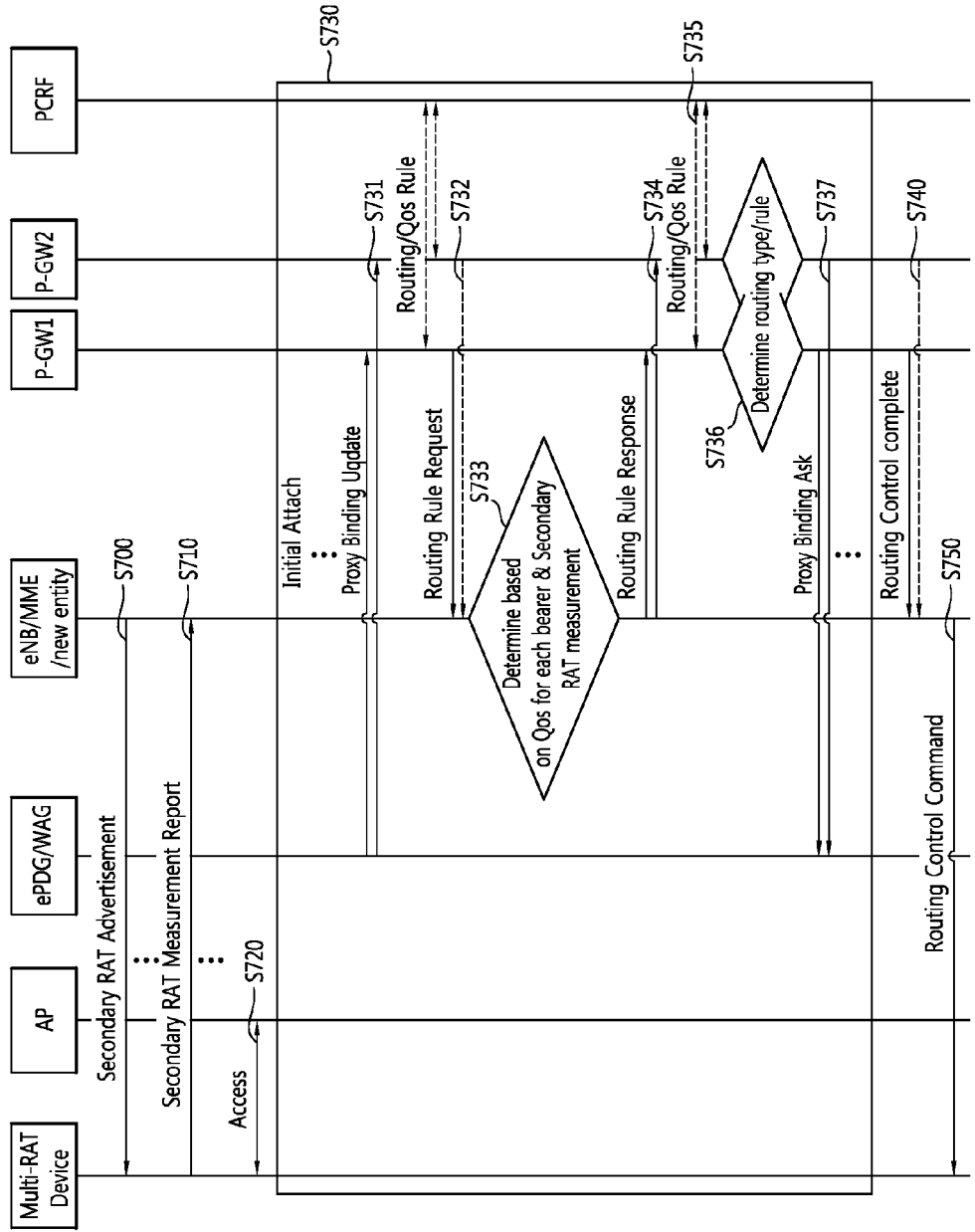
FIG. 13 shows an example of a method for establishing a session according to another embodiment of the present invention.

FIG. 13 shows an example of a method for establishing a session according to another embodiment of the present invention.

Step S700 to S720 are the same respectively as step S500 to S520 of FIG. 12.

Therefore, descriptions thereof are omitted. Hereinafter, the initial attachment process of step S730 is described in more detail.

In step S731, based on information about more than one P-GW of the corresponding multi-RAT device acquired through HSS or AAA, the ePDG or WAG transmits a proxy binding update message to the P-GW.

In step S732, the P-GW transmits a routing rule request message to the entity of the LTE system. Each P-GW may acquire the routing type/rule for a bearer/flow from the PCRF and based on the acquired information, may determine whether simultaneous transmission is appropriate.

Accordingly, the P-GW, which has determined that simultaneous transmission is appropriate, may request a routing rule about a bearer(s) of the corresponding multi-RAT device from the entity of the LTE system.

Step S733 to S736 are the same respectively as step S550 to S580 of FIG. 12. Therefore, descriptions thereof are omitted.

In step S737, the P-GW, which has determined to apply simultaneous transmission, transmits a proxy binding acknowledge message, the state of which is "binding update accept", to the ePGD or WAG. The P-GW, which has determined not to apply simultaneous transmission, transmits the proxy binding acknowledge message, the state of which is "binding update not suitable", to the ePDG or WAG.

Step S740 and S750 are the same respectively as step S590 and S600 of FIG. 12. Therefore, descriptions thereof are omitted.

Figure 14:
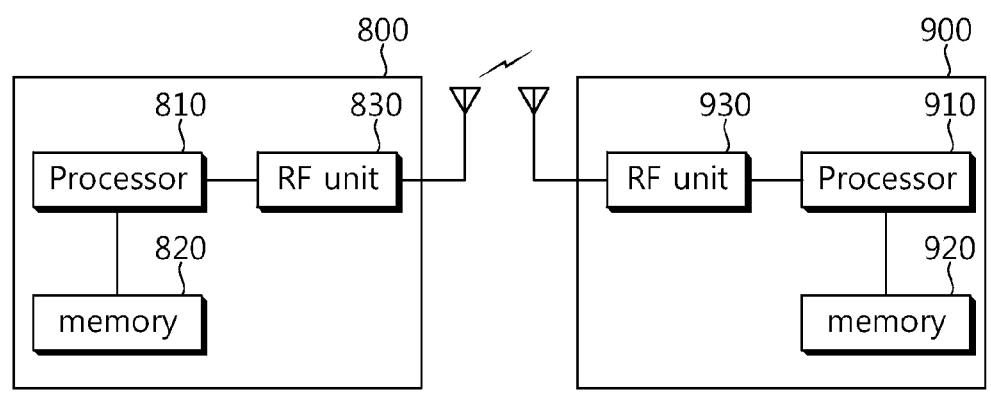
FIG. 14 shows a wireless communication system to implement an embodiment of the present invention.

FIG. 14 shows a wireless communication system to implement an embodiment of the present invention.

An entity of an LTE system 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for enabling, by an entity of a primary radio access technology (RAT) system, aggregation of the primary RAT system and a secondary RAT system in a wireless communication system, the method comprising:
   receiving measurement results on the secondary RAT system from a multi-RAT device;
   determining aggregation of the primary RAT system and the secondary RAT system and which bearers are used for simultaneous transmission through the primary RAT system and the secondary RAT system, based on the measurement results on the secondary RAT system; and
   transmitting a message including identities (IDs) of bearers which are determined to be used for the simultaneous transmission through the primary RAT system and the secondary RAT system to the multi-RAT device.

2. The method of claim 1, wherein the measurement results are received via a secondary RAT access response message or a secondary RAT measurement report message.

3. The method of claim 1, further comprising:
   before receiving the measurement results, transmitting a secondary RAT access request message, which includes a list of access points (APs) of the secondary RAT system, to the multi-RAT device.

4. The method of claim 1,
   wherein the message includes a list of APs of the secondary RAT system.

5. The method of claim 1, further comprising:
   upon transmitting the message, receiving a secondary RAT access response message from the multi-RAT device,
   wherein the secondary RAT access response message includes a result of an access to the secondary RAT system.

6. The method of claim 1, wherein the primary RAT system is a 3rd generation partnership project (3GPP) long-term evolution (LTE) system, and
   wherein the secondary RAT system is an institute of electrical and electronics engineers (IEEE) 802.11 system.

7. The method of claim 1, wherein the entity of the primary RAT system is an eNodeB (eNB).

8. An entity of a primary radio access technology (RAT) system in a wireless communication system, the entity comprising:
   a memory;
   a radio frequency (RF) unit; and
   a processor, coupled to the memory and the RF unit, that:
   controls the RF unit to receive measurement results on a secondary RAT system from a multi-RAT device,
   determines aggregation of the primary RAT system and the secondary RAT system and which bearers are used for simultaneous transmission through the primary RAT system and the secondary RAT system, based on the measurement results on the secondary RAT system; and
   controls the RF unit to transmit a message including identities (IDs) of bearers which are determined to be used for the simultaneous transmission through the primary RAT system and the secondary RAT system to the multi-RAT device.

* * * * *